United States Patent
Seth et al.

(10) Patent No.: US 9,661,067 B2
(45) Date of Patent: May 23, 2017

(54) SYSTEMS AND METHODS FOR FACILITATING DIALOGUE MINING

(71) Applicant: 24/7 CUSTOMER, INC., Campbell, CA (US)

(72) Inventors: Suchana Seth, Bangalore (IN); Bhupinder Singh, Bangalore (IN); Mathangi Sri Ramachandran, Bangalore (IN); Ravi Vijayaraghavan, Bangalore (IN); Pallipuram V. Kannan, Los Gatos, CA (US)

(73) Assignee: 24/7 CUSTOMER, INC., Campbell, CA (US)

( * ) Notice: Subject to any disclaimer, the term of this patent is extended or adjusted under 35 U.S.C. 154(b) by 320 days.

(21) Appl. No.: 14/580,859

(22) Filed: Dec. 23, 2014

(65) Prior Publication Data

US 2015/0178371 A1 Jun. 25, 2015

Related U.S. Application Data

(60) Provisional application No. 61/920,351, filed on Dec. 23, 2013.

(51) Int. Cl.
G06F 7/00 (2006.01)
H04L 29/08 (2006.01)
G06F 17/30 (2006.01)

(52) U.S. Cl.
CPC ........ *H04L 67/10* (2013.01); *G06F 17/30398* (2013.01); *G06F 17/30654* (2013.01); *G06F 17/30707* (2013.01)

(58) Field of Classification Search
CPC ................................................. G06F 17/30398
See application file for complete search history.

(56) References Cited

U.S. PATENT DOCUMENTS

2012/0020473 A1 1/2012 Mart et al.
2012/0065963 A1 3/2012 Bangalore et al.

*Primary Examiner* — Ajith Jacob
(74) *Attorney, Agent, or Firm* — Perkins Coie LLP

(57) ABSTRACT

The disclosure is related to mining of text to derive information from the text that is useful for a variety of purposes. The text mining process can be implemented in a service oriented industry such as a call center, where a customer and an agent engage in a dialog, e.g., to discuss product/service related issues. The messages in dialogues between the customers and the agents are tagged with features that describe an aspect of the conversation. The text mining process can mine various dialogues and identify a set of features and messages based on prediction algorithms. The identified set of features and messages can be used to infer an intent of a particular customer for contacting the agent, and to generate a recommendation based on the determined intent.

11 Claims, 9 Drawing Sheets

SYSTEMS AND METHODS FOR FACILITATING DIALOGUE MINING

CROSS-REFERENCE TO RELATED APPLICATION(S)

This application claims the benefit of U.S. Provisional Patent Application No. 61/920,351, entitled "SYSTEMS AND METHODS FOR FACILITATING DIALOGUE MINING" filed on Dec. 23, 2013, which is incorporated by reference herein in its entirety.

TECHNICAL FIELD

The disclosed embodiments generally relate to text mining and more specifically to mining of textual content associated with dialogues.

BACKGROUND

The terms, 'text mining' or 'text data mining', generally relate to performing analysis of vast quantities of textual content with an aim to derive insights from the data contained therein. Examples of textual content may include word documents, emails, instant messenger conversations, web textual content like blogs, online articles, user posts on social networking websites, and the like. In an example scenario, text mining techniques may be applied to textual content associated with dialogues, such as online chat conversations (or even text transcripts of voice call conversations) between customer service representatives and potential/existing customers. The application of the text mining techniques to dialogues may be performed to gain insights into the possible intentions of the customers for contacting the customer service representatives and also into the possible recommendations that may be offered to the customers.

Typical text mining techniques are not configured to differentiate among expository, descriptive or narrative textual content and goal-directed dialogues such as conversations between customer service representatives and customers. Further, such techniques may extract features from the conversations without attempting to exploit any inherent structure arising from nature and purpose of the conversations. As a result, conventional techniques for text mining are rendered inadequate for the purpose of deriving insights from textual content, such as dialogues.

SUMMARY

Disclosed are embodiments directed to tagging of text with features that describe one or more aspects of the text. The tagging of the text can facilitate mining of text to derive information from the text that can be used for a variety of purposes, e.g., for improving quality of service in a call center scenario by providing more focused responses to customers. A customer and an agent can have a dialog with each other to discuss various product/service related issues. The dialogues are stored in a storage system. The text mining process can mine various dialogues between the customers and the agents and identify some features of the dialogs, e.g., an interesting aspect of the dialog between a customer and an agent. The mined features of the dialog and/or the associated dialog can be used for various purposes, e.g., determining an intent of a particular customer for contacting the agent, for generating a recommendation based on the determined intent, for making suggestions to auto completing a word/phrase/sentence being input by the agent.

The disclosed embodiments enable a system to automatically tag messages exchanged between users, e.g., a customer and the agent, with various features. In other embodiments of the invention, the system not always automatically tag the messages. In such embodiments, the platform allows event-level, word level, and phrase level tagging in real-time by any of the customer, agent, supervisor, or QA teams.

Further, the system can tag the messages in real-time, that is, while the dialog between the users is in progress. The system can tag a particular message exchanged between the users with one or more features based on various factors, e.g., actions of the users and mined information derived from the text mining process. The actions of the users can include tagging of the messages by the users, responding to messages, accepting or rejecting the recommendations made by the system, etc. For example, the system can tag the particular message with a particular feature based on a feature input received from a customer, an agent or a supervisor of the agent. In another example, the system can automatically tag a message with a feature, e.g., a feature that indicates whether the agent accepted an auto suggestion made by the system, a feature that indicates whether the agent accepted a recommendation made by the system for responding to the customer, a feature that indicates a commitment made by the agent, a feature that indicates an emotion of the customer associated with the particular message. In another embodiment, the system can compare the particular message with other messages of other dialogs by comparing mined structured information from the particular message with other messages, for auto tagging other messages, based on certain criterion. For example, if the system finds another message in another dialog that is similar to the current dialog between the customer and the agent, the system can tag the particular message with a feature of the another message or vice-versa.

The mined information enables an intent prediction engine to classify intents of a customer for contacting the agent, and enables a recommendation engine to propose recommendations based on the classified intent that the agent can present to the customer. The intent prediction engine and the recommendation engine can also consider a profile of the customer ("customer profile") to determine the intent and propose the recommendations. The customer profile can include information related to the customer's surfing activity on the website, such as pages visited, events on page, rules fired on the page and the like.

When a customer and the agent exchange messages, e.g., using a chat application, the agent (and also the customer in some cases) can tag the message with one or more features that indicate an aspect of the conversation. For example, the tag can indicate whether the response was useful in solving the problem, whether the message is in a greeting stage of the conversation, whether the message indicates a particular commitment made by the agent, whether the agent likes or dislikes a particular message made by the customer or vice versa, etc. The messages are stored in a storage system, e.g., a database, with their associated features. The text mining process can analyze the features and the messages based on some known prediction models, algorithms or techniques to generate the mined information.

In some embodiments, the agent and the customer can have a dialog with each other using a chat application executing on their respective computing devices. The chat application provides various graphical user interface (GUI)

elements that facilitates the agent and/or the customer to tag a message with one or more features. In the chat application executing on a computing device associated with the agent, the GUI also presents a profile of the customer, a number of predicted intents of the customer, proposed recommendations for responding to the queries of the customer, etc.

In some embodiments, the agent and the customer can have a dialog with each other via audio devices, e.g., telephone. The voice conversation between the customer and the agent can be recorded and a speech-to-text transcription containing the messages of the voice conversation can be generated at a later time or in real-time. The agent may optionally tag the messages from the transcript using an application that provides tagging features, e.g., an application similar to the chat application described above.

DETAILED DESCRIPTION

Figure 1A:
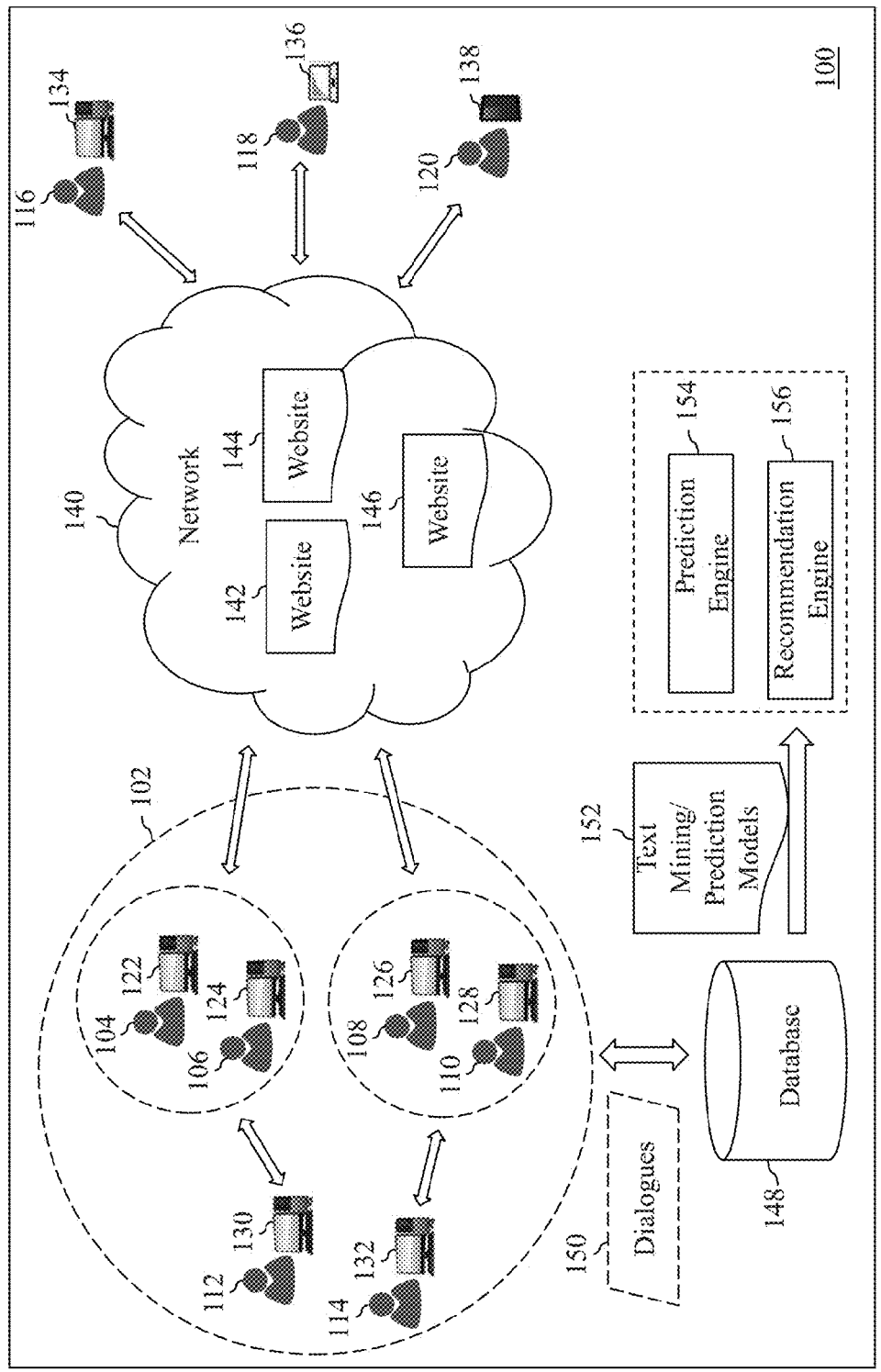
FIG. 1A illustrates an environment in which various embodiments of the present technology can be implemented.

The term 'dialogue' as used hereinafter refers to textual content corresponding to a conversation between a customer and a customer service representative ("agent"). The textual content may be generated on account of an interactive online chat conversation between the customer and the agent. In some embodiments, the textual content may also correspond to a speech-to-text transcript of a voice call conversation between the customer and the agent.

Disclosed are embodiments directed to tagging of text with features that describe one or more aspects of the text. The tagging of the text can facilitate mining of text to derive information from the text that can be used for a variety of purposes, e.g., for improving quality of service in a call center scenario by providing more focused responses to customers. A customer and an agent can have a dialog with each other to discuss various product/service related issues. The dialogues are stored in a storage system. The text mining process can mine various dialogues between the customers and the agents and identify some features of the dialogs, e.g., an interesting aspect of the dialog between a customer and an agent. Examples of features can be, products discussed in a dialog, whether a cross-sell/upsell was made, whether the resolution offered by an agent was accepted by a customer, resolution to a query of a customer, etc. The mined features of the dialog and/or the associated dialog can be used for various purposes, e.g., determining an intent of a particular customer for contacting the agent, for generating a recommendation based on the determined intent, for making suggestions to auto completing a word/phrase/sentence being input by the agent, or searching other dialogs with similar features tagged.

The disclosed embodiments enable a system to automatically tag messages exchanged between users, e.g., a customer and the agent, with various features. Further, the system can tag the messages in real-time, that is, while the dialog between the users is in progress. The system can tag a particular message exchanged between the users with one or more features based on various factors, e.g., actions of the users and mined information derived from the text mining process. The actions of the users can include tagging of the messages by the users, responding to messages, accepting or rejecting the recommendations made by the system, etc. For example, the system can tag the particular message with a particular feature based on a feature input that is received from a customer, an agent, or a supervisor of the agent such as, for example, product mentions, cross-sell, intents, resolution to intents, cross-sell, upsell, chat outcome, moods, personas, dialog stage, miss-spellings, etc. In another example, the system can automatically tag a message with a feature, e.g., a feature that indicates whether the agent accepted an auto suggestion made by the system, a feature that indicates whether the agent accepted a recommendation made by the system for responding to the customer, a feature that indicates a commitment made by the agent, a feature that indicates an emotion of the customer associated with the particular message. In another embodiment, the system can compare the particular message with other messages of other dialogs using the features generated text mining process and use the mined information obtained from the text mining process to tag the particular message. For example, if the system finds another message in another dialog that is similar to the current dialog between the customer and the agent, the system can tag the particular message with a feature of the another message.

The mined information enables an intent prediction engine to classify intents of a customer for contacting the agent, and enables a recommendation engine to propose recommendations based on the classified intent that the agent can present to the customer. The intent prediction engine and the recommendation engine can also consider a profile of the customer ("customer profile") or interaction history to determine the intent and propose the recommendations. The customer profile can include information related to the customer's surfing activity on the website, such as pages visited, events on page, rules fired on the page and the like.

When a customer and the agent exchange messages, e.g., using a chat application, the agent (and also the customer in some cases) can tag the message with one or more features that indicate an aspect of the conversation. For example, the tag can indicate whether the response was useful in solving the problem, the stage of the conversation, for example, greeting, problem identification, troubleshooting, problem resolution, closure, etc., whether the message indicates a particular commitment made by the agent, whether the agent likes or dislikes a particular message made by the customer or vice versa, etc. The messages are stored in a storage system, e.g., a database, with their associated features. The text mining process can analyze the features and the messages based on some known prediction models, algorithms or techniques to generate predictions from the structured information logged after the tags are stored to a storage system.

In some embodiments, the agent and the customer can have a dialog with each other using a chat application executing on their respective computing devices. The chat application provides various graphical user interface (GUI) elements that facilitates the agent and/or the customer to tag a message with one or more features. In the chat application executing on a computing device associated with the agent, the GUI also presents a profile of the customer; a number of predicted intents of the customer for each line of chat or each Web session, etc. or rank ordered intent category based on the confidence scores being higher than a threshold for any given interaction; proposed recommendations for responding to the queries of the customer; etc.

In some embodiments, the agent and the customer can have a dialog with each other via audio devices, e.g., telephone. The voice conversation between the customer and the agent can be recorded and a speech-to-text transcript containing the messages of the voice conversation can be generated at a later time or in real-time. The agent may optionally tag the messages from the transcript using an application that provides tagging features, e.g., an application similar to the chat application described above.

FIG. 1A illustrates an environment 100 in which the text mining process can be implemented. The environment 100 depicts a simplified visual representation of a customer service center 102 including a plurality of customer service representatives (referred to as 'agents' hereinafter), such as an agent 104, an agent 106, an agent 108 and an agent 110. The customer service center 102 further includes a plurality of supervisors, such as a supervisor 112 and a supervisor 114. Each supervisor from among the plurality of supervisors is entrusted, at least in part, with the role of supervising conversations between agents and customers. For example, the supervisor 112 is depicted to be entrusted with the supervision of conversations involving the agents 104 and 106, and, the supervisor 114 is depicted to be entrusted with the supervision of conversations involving the agents 108 and 110.

It is understood the customer service center 102 is depicted to include four agents (for example, agents 104-110) and two supervisors (for example, supervisors 112-114) for illustration purposes and that the customer service center 102 may include a plurality of such agents and supervisors. Moreover, a number of agents supervised by a supervisor may also vary from the number depicted in environment 100. Further, the supervisors 112-114 may supervise the conversations involving the agents 104-110 on a real-time basis or in an offline manner.

Each agent from among the plurality of agents is associated with an electronic device (also referred to as "computing device") for engaging in a conversation (such as an interactive chat conversation or a voice call conversation) with existing/potential customers disposed at diverse geographical locations, such as customers 116, 118 and 120. For example, the agent 104 is associated with electronic device 122; the agent 106 is associated with an electronic device 124, the agent 108 is associated with an electronic device 126 and the agent 110 is associated with an electronic device 128. The supervisors are similarly associated with electronic devices for supervising the conversations involving the agents. For example, the supervisor 112 is associated with an electronic device 130 and the supervisor 114 is associated with the electronic device 132.

The electronic devices 122, 124, 126, 128, 130 and 132 are depicted as desktop computers for illustration purposes, and it is understood that the electronic devices 122-132 may be any electronic device configured to facilitate an interaction between two remote entities (for example, an agent and an existing/potential customer or even a supervisor and an agent). For example, one or more electronic device from among the electronic devices 122-132 may be a telephone instrument configured to facilitate a voice call conversation between an agent and a customer. The customers 116, 118 and 120 may similarly be associated with electronic devices for engaging in conversations with the agents 104-110. The customer 116 is depicted to be associated with a desktop computer 134, the customer 118 is depicted to be associated with a laptop 136 and the customer 120 is depicted to be associated with a tablet personal computer 138. It is noted that the electronic devices, such as the desktop computer 134, the laptop 136 and the tablet personal computer 138 are depicted for illustration purposes.

The conversations between the agents 104-110 and the customers 116-120 may be performed over a network 140. Examples of the network 140 may include wired networks, wireless networks or a combination thereof. Examples of wired networks may include Ethernet, local area network (LAN), fiber-optic cable network and the like. Examples of wireless network may include cellular networks like GSM/3G/CDMA networks, wireless LAN, Bluetooth or Zigbee networks and the like. An example of a combination of wired and wireless networks may include the Internet. In an example scenario, the network 140 may provision access to one or more websites included therein, such as a website 142, a website 144 and a website 146. The websites may be accessed by existing/potential customers such as the customers 116-120.

During the course of browsing through a website, such as an e-commerce based website, a customer may wish to engage in a conversation with a customer service representative (for example, an agent from among the agents 104-110) to inquire about a product or a service prior to making a purchase of the product or the service. Accordingly, a customer, such as a customer from among the customers 116-120, may initiate a conversation in the form of a chat conversation with an agent from among the agents 104-110. It is noted that though the conversations (for example, online chat conversations or voice calls) mentioned herein refer to conversations initiated by customers to the agents, however in some embodiments, conversations may also be initiated by the agents to contact the customers. For example, agents such as the agents 104-110 may initiate the conversations for soliciting a purchase of a product/service or requesting feedback related to a product/service offered on a website from among the websites 142-146. The chats may be proactively offered to customers who visit a website, where the customers have been predicted to have a high propensity to chat or to have a high propensity to make a purchase. Such proactive chats may be system generated, based on the output of a model, or they may be configured by a set of rules.

In some example scenarios, textual content corresponding to the conversations between the customers 116-120 and the agents 104-110 are stored in a database 148 as dialogues 150. Further, the database 148 is configured to store interaction data such as which agent handled the dialogue, the outcome of the dialogue, dialogue transfers if any and the like. Additionally, the database 148 may also be configured to store information corresponding to the customer, such as the customer profile information and information related interaction history, such as customer's surfing activity on the website, such as pages visited, events on page, rules fired on the page and the like. The information stored in the database 148 may be subjected to a set of text mining and predictive models 152 or other models, such as extraction algorithms to extract URLs, phone numbers, email address, person names, product mentions, brand mentions, etc., for mining relevant information that drive an intent prediction engine 154 and a recommendation engine 156. The mined information enables the intent prediction engine 154 to infer intents of the customers 116-120 for contacting the agents 104-110, and the recommendation engine 156 to propose recommendations based on the classified or inferred intent. The intent prediction engine 154 and the recommendation engine 156 can also consider the customer profile to determine the intent and propose the recommendations or routing customer to relevant queue.

Figure 1B:
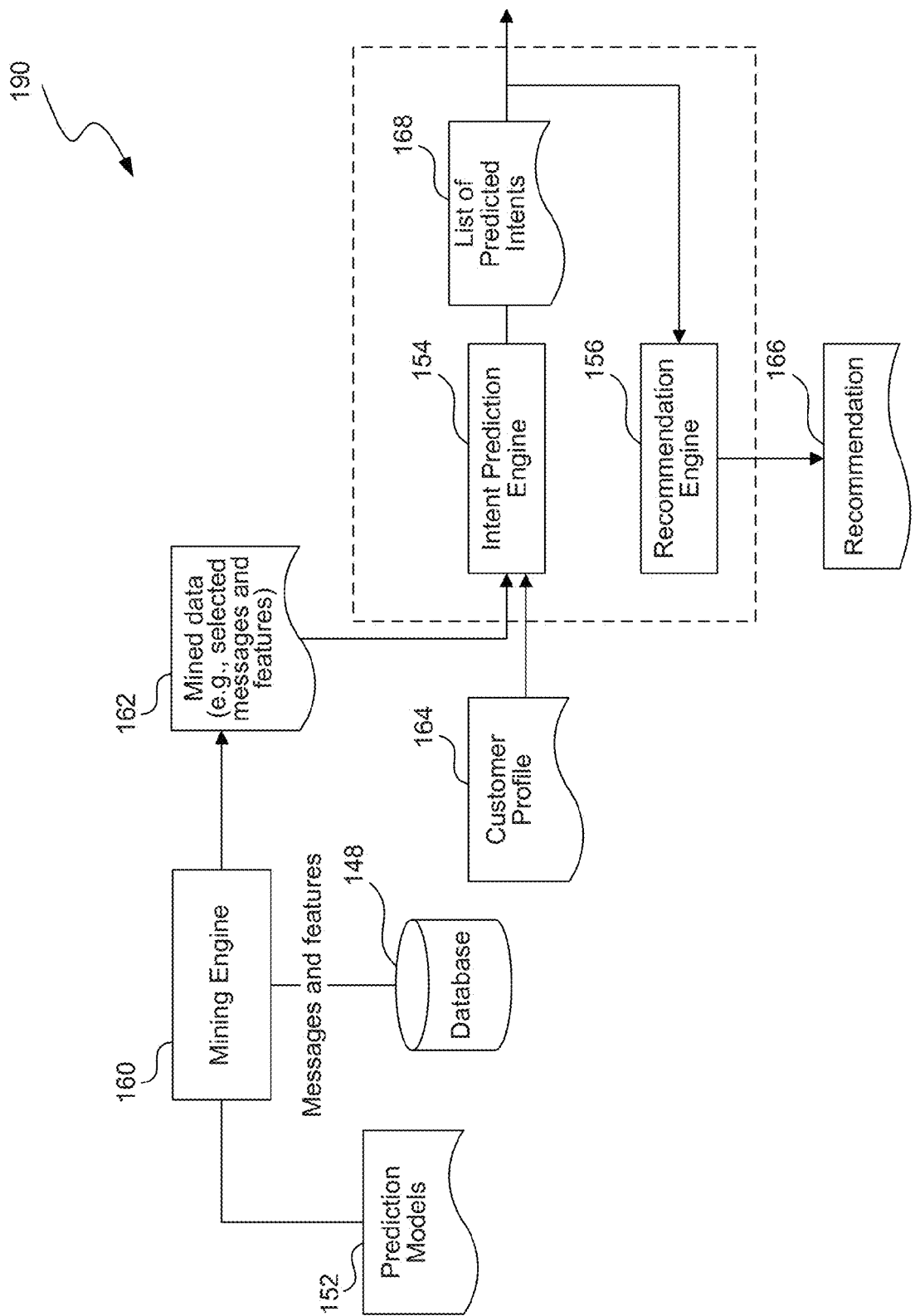
FIG. 1B is a block diagram of system for recommending a set of responses to an agent for presenting to a customer by using a text mining process in accordance with an embodiment.

FIG. 1B is a block diagram of system for recommending a set of responses to an agent for presenting to a customer by using a text mining process in accordance with an embodiment. The system 190 can be implemented in the environment 100. The system 190 includes a mining engine 160 that mines information from dialogues between a number of customers, e.g., customers 116-120, and a number of agents, e.g., agents 104-110, to generate mined information 162 based on one or more prediction models 152. The dialogues are input to the mining engine 160 from the database 148. The mined information 162 can include a set of messages and/or a set of features identified based on the prediction models 152. In some embodiments, the prediction models include Logistic regression, Naïve Bayesian, Rule Engines, Neural Networks, Decision Trees, Support Vector Machines, hierarchical clustering k-nearest neighbor, K-means.

The mining engine 160 is configured to extract features, which may include all of the metadata that is tagged, for example price features, date features, email address, first name/last name, and which can also include metadata from Web journeys, etc., by utilizing a relationship between the customer and agent interactions. Examples of the features that may be fed into the prediction models can include any combinations of words features such as n-grams, unigrams, bigrams and trigrams, word phrases, presence or an absence of a phrase, part-of-speech of words, emotion of words, emotion of sentences, position of words, customer keyword searches, customer click data, customer web journeys, the customer interaction history.

The mined information 162 is utilized for predicting one or more of customer primary intent, customer secondary intent, resolution for any of customer primary or secondary intent, outcome of a chat, response of a customer to a resolution offered by the agent, etc., and for generating a recommendation to the agent or customer. The prediction engine 154, for example, predicts the intent 168 of the customer as a function of the mined information 162 and a customer profile 164 of the customer who contacted the agent. In some embodiments, the prediction engine 154 generates a list of intents 168 that includes one or more probable intents of the customer. In some embodiments, the list of intents 168 can be ordered based on the probability of the predicted intent, which depicts the likelihood of the predicted intent being the actual intent. The list of intents 168 along with the mined information 162 and the customer profile 164 are input to the recommendation engine 156, which processes the input data to propose recommendations 166 to the agent. In some embodiments, the recommendations 166 are displayed to the agent on a computing device, e.g., computing devices 122-132, associated with the agent. The agent can view the proposed recommendations 166 and choose one or more of the recommendations 166 to present to the customer.

Various embodiments of the present invention provide systems and methods for facilitating dialogue mining that are capable of overcoming these and other obstacles and providing additional benefits. More specifically, systems and methods disclosed herein enable addition of meta-data derived from structural features of a dialogue in real time and saving of the dialogue along with the meta-data in a manner that enables easier mining of the textual content subsequently. A system for facilitating dialogue mining is explained with reference to FIG. 2.

Figure 2:
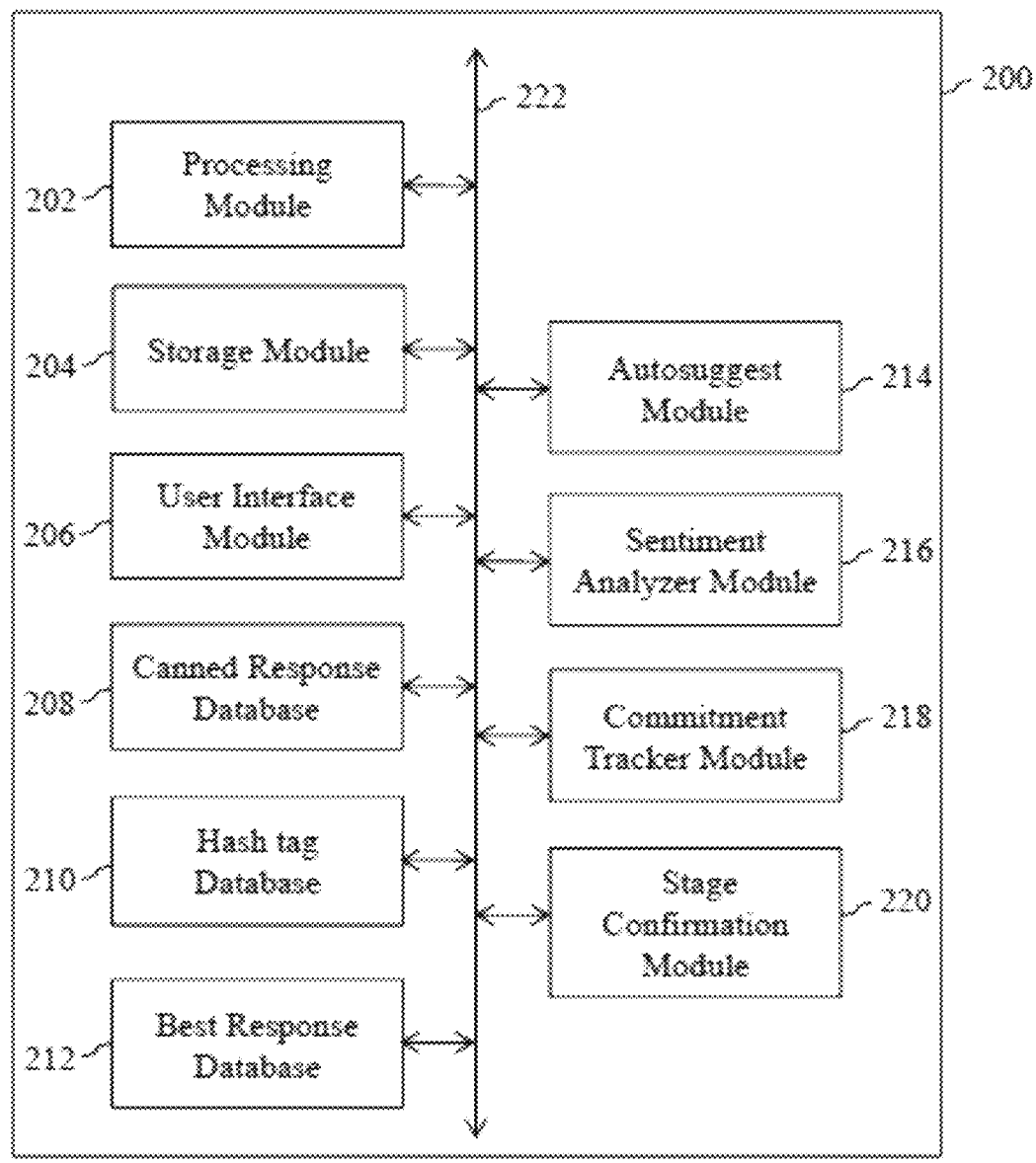
FIG. 2 is a block diagram of a system configured to facilitate dialogue mining in accordance with an embodiment.

FIG. 2 is a block diagram of a system 200 configured to facilitate dialogue mining in accordance with an embodiment. The system 200 is configured to be in communication with the electronic devices 122-132 associated with the agents 104-110 and the supervisors 112-114 of FIG. 1A. More specifically, each of the electronic devices 122-132 and the system 200 include requisite hardware, software and/or firmware (not illustrated) for interacting with each other. For example, the electronic devices 122-132 may access the system 200 using wired means, wireless means or a combination thereof.

The system 200 is configured to facilitate tagging of a dialogue being conducted using an electronic device from among the electronic devices 122-132 with features to facilitate an efficient mining of the dialogue subsequently. For example, in embodiments including a dialogue in form of an online chat conversation, a chat word, a chat line or even an entire chat conversation may be tagged, e.g., labeled, with one or more features to capture context, emotion, intent, and progress towards the goal of the chat conversation as the chat conversation progresses in real-time. The tagging may be done by the customer, agent, supervisor or quality assurance team at a later time as well.

The system 200 is depicted to include various components, e.g., a processing module 202, a storage module 204, a user interface module 206, a canned response database 208, a tag database 210, a best response database 212, an autosuggest module 214, an emotion analyzer module 216, a commitment tracker module 218 and a stage confirmation module 220. The various components of the system 200 can communicate with each other via a bus 222. Examples of the bus 222 may include a data bus, a control bus, an address bus, a serial bus, a bi-directional bus and the like. It is noted that the system 200 may include fewer or more components than that depicted in FIG. 2.

In an embodiment, the processing module 202 of the system 200 is configured to tag/label an on-going dialogue between an agent, e.g., one of agents 104-110, and a customer, e.g., one of customers 116-120, with features. In an embodiment, the dialogue may be saved along with corresponding features (also referred to herein as 'meta-data') by the processing module 202 in the storage module 204. In an embodiment, the storage module 204 is configured to include the database 148 along with the corresponding information. In some embodiments, the storage module 204 and the one or more databases, such as the canned response database 208, the hash tag database 210 and the best response database 212 may be configured using one or more volatile memories, one or more non-volatile memories or a combination of volatile and non-volatile memories.

The facilitation of dialogue mining by enabling the tagging/labeling of the dialogue with features by the various components of the system 200 are explained hereinafter with an example of a goal-directed dialogue in form of an interactive chat on a website between a customer and an agent. However, the embodiments described hereinafter may not be limited to interactive chats and that speech-to-text transcripts of voice call dialogues may also be mined using the system 200. It is understood that appropriate adjustments may be configured for facilitating dialogue mining of textual content associated with voice call dialogues by the system 200.

In an example scenario, when the customer visits and browses through a website, a customer profile and the customer's surfing activity on the website are recorded and analyzed in real-time to predict customer's intent and identify possible recommendations to the customers. The prediction of the customer intents and the identification of the recommendations are performed by an intent prediction engine, e.g., the intent prediction engine 154, and a recommendation engine, e.g., the recommendation engine 156, respectively. In an embodiment, the customer may choose to interact with an agent to request information regarding a product or service or to make a purchase of the product or a service.

Figure 4:
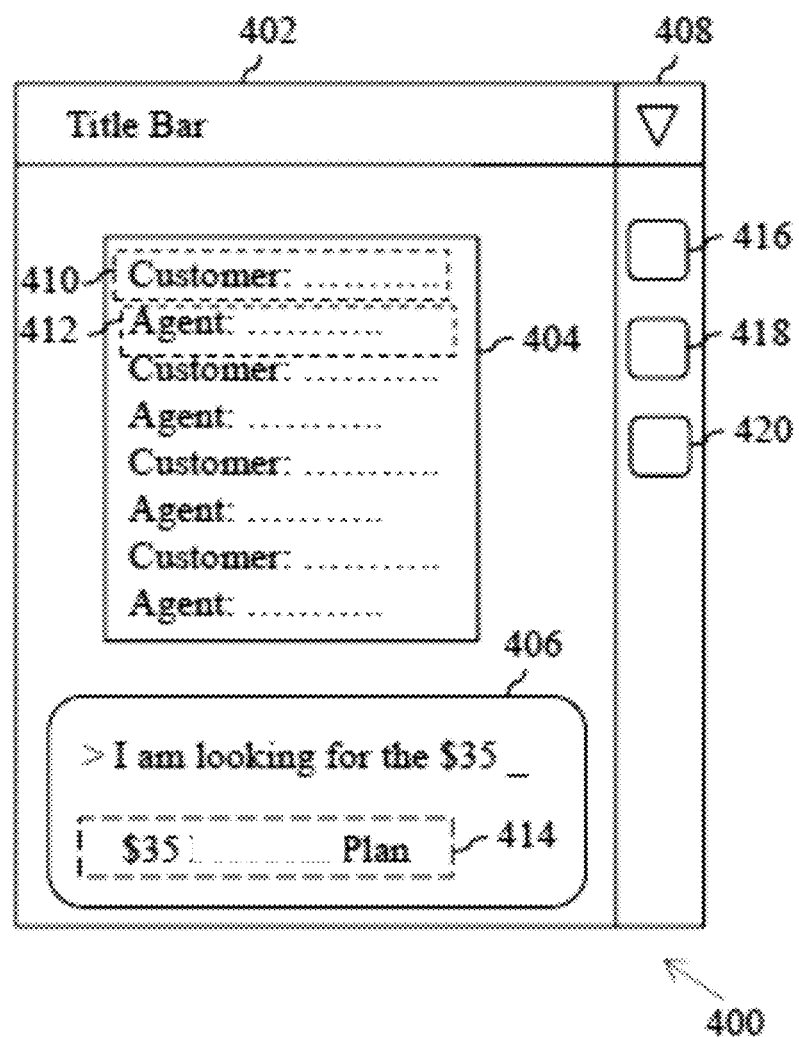
FIG. 4 is a block diagram of a customer chat console configured to enable a customer to engage in a dialogue with an agent in accordance with an embodiment.
Figure 5:
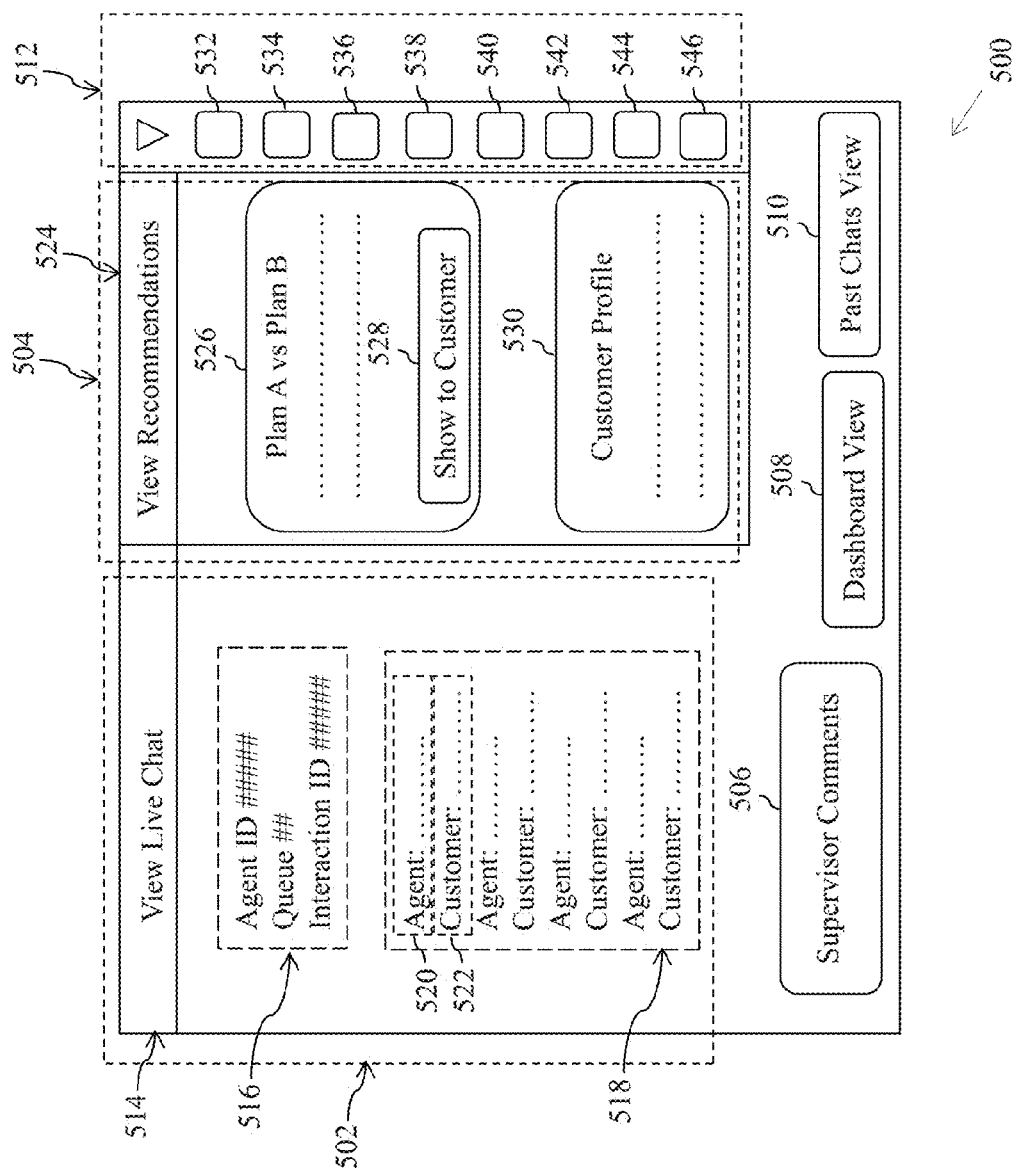
FIG. 5 is a block diagram of a supervisor chat console configured to enable a supervisor to supervise dialogues of agents under his/her supervision in accordance with an embodiment.

The UI module 206 can be configured to support interactive chats on such websites. More specifically, the UI module 206 can be configured to populate chat consoles with options, which facilitate in tagging features to the dialogues. The chat console as used herein refers to a window that pops up within an Internet browser application UI corresponding to a particular webpage to facilitate an interactive dialogue between an agent and a customer. In some embodiments, a chat console is also provisioned to a supervisor, e.g., one of the supervisors 112-114, for supervising the dialogues between one or more agents and the supervisors and providing feedback to the agent on the on-going dialogue in real-time. Example chat consoles for the agent, the customer and the supervisor are depicted in FIGS. 3, 4 and 5, respectively.

Figure 3:
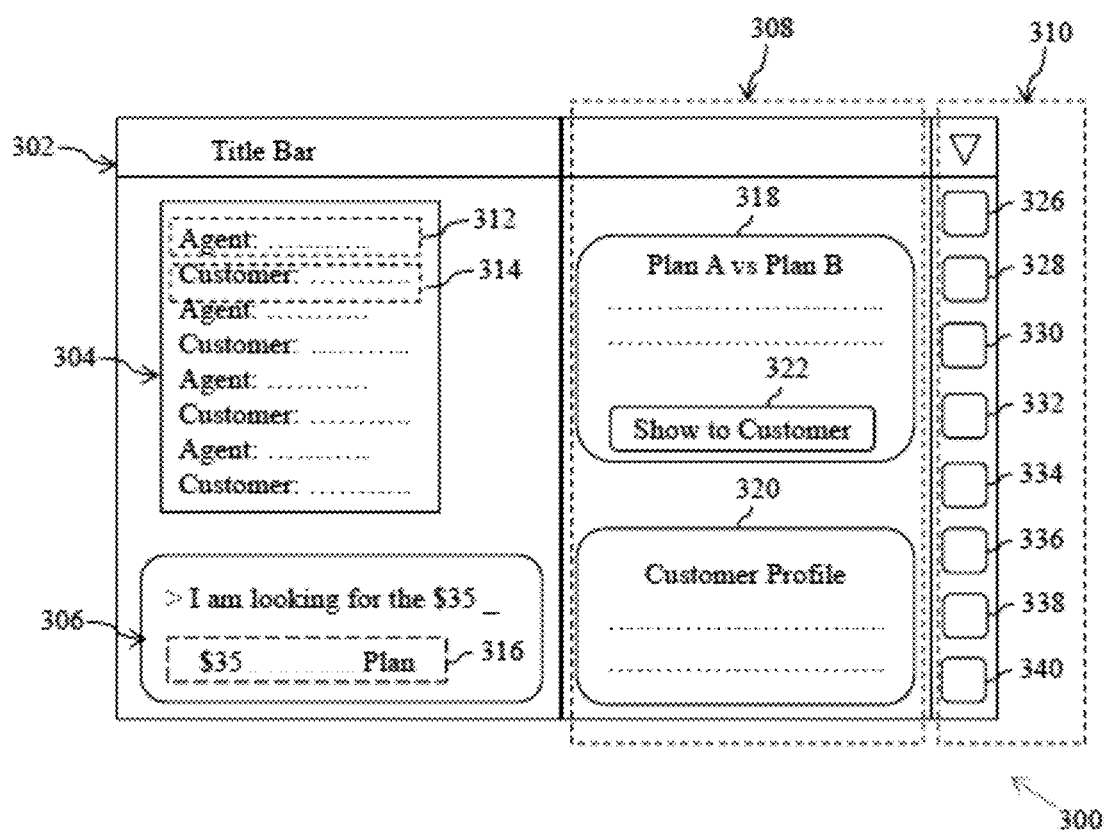
FIG. 3 is a block diagram of an agent chat console configured to enable an agent to engage in a dialogue with a customer in accordance with an embodiment.

Referring now to FIG. 3, an agent chat console 300 configured to enable an agent to engage in a dialogue with a customer is illustrated in accordance with an embodiment. The agent chat console 300 is depicted to include a title bar 302, a chat dialogue display section 304, an autosuggest section 306, a recommendation area 308 and a palette 310 of options for facilitating feature-tagging of textual content associated with dialogue between the agent and the customer. The title bar 302 may be configured to display at least one of a name of a customer involved in the dialogue with the agent, an agent name and an agent identification number and the like. The chat dialogue display section 304 is configured to display the dialogue between the customer and the agent in an on-going manner in real-time. The chat text typed by the agent and the customer can be displayed next to the agent's name and the customer's name, respectively, as illustrated in dotted blocks 312 and 314 in the chat dialogue display section 304.

In an embodiment, the autosuggest section 306 is configured to allow the agent to type in text and facilitate the completion of the word/line corresponding to the text. For example, in FIG. 3, the agent is depicted to be typing a line "I am looking for the $35" in the autosuggest section 306, when a suggestion box 316 provides a suggestion "$35 Plan" as a possible completion of the sentence. The autosuggest module 214 depicted in FIG. 2 may be configured to facilitate provision of appropriate suggestions for word/line completions. A subsequent selection (or even a non-selection) of the suggestion offered in the suggestion box 316 may be considered as validation/non-validation of a correctness of the suggestion offered and as such, this information may be stored along with the corresponding textual content as a feature for subsequent use in dialogue mining. In an embodiment, the autosuggest module 214 is configured to communicate with the canned response database 208, the hash tag database 210 as well as other relevant text mining models for provisioning appropriate suggestions for word/line completions in the autosuggest section 306. Accordingly, the autosuggest module 214 enables building a corpus of labeled training data which would otherwise have to be generated manually. Further, the autosuggest module 214 also improves an accuracy of labeled data by significantly reducing misspellings and unintended variation in the labels, thereby making it simpler to build dialogue mining models without the need for running the text normalization algorithms.

In an embodiment, the recommendation area 308 includes a recommendation section 318 and a customer profile section 320. As explained above, the recommendation engine generates a set of recommendations, which serve as relevant information for assisting the agent to better understand and fulfil the customer's needs as well as for suggesting actions that the agent can take towards the desired outcome of the dialogues. Such recommendations can be presented to the agent in the recommendation area 308 within the agent chat console 300. In an embodiment, customer information from various sources such as past interactions, social media, customer relationship management (CRM) data and the like may be used to segment and profile the customer to generate profile information for each given customer. The profile information is provided as recommendation to the agent in the customer profile section 320 of the recommendation area 308.

Further, as explained above, the prediction engine can predict the customer intent based on the pages visited on the website by the customer. For example, a customer may wish to purchase a mobile handset with a voice/data plan, and is uncertain about which handset or voice/data plan is most suitable for him/her. The prediction engine predicts the customer intent to purchase, as well as the handsets (brands and models) of interest to the customer based on the pages he/she has visited on the website prior to engaging in a dialogue with the agent. In an embodiment, based on the customer intent, the agent is provided with a set of handset and plan combinations in interest of the customer as a recommendation. For example, a set of handsets associated with one or more brands in combination with voice/data plans for each handset may be suggested to the agent in the recommendation section 318 of the recommendation area 308.

Further, the agent may be suggested with a cross-sell strategy and an up-sell strategy for the given customer based on the customer intent. A cross-sell strategy may correspond to an approach of suggesting related products to a customer in addition to the product the customer is interested in purchasing. For example, if the customer is interested in purchasing a handset, then the customer may be offered related accessories to purchase, such as a headphone, a mobile charger, a Bluetooth handsfree equipment, a flip cover and the like. An up-sell strategy may correspond to an approach of suggesting to a customer, related products of higher value than the product the customer is interested in purchasing. For example, if the customer intends to purchase a handset then the customer may be offered other handset models of higher value and including more or improved features.

In an embodiment, the prediction engine may also predict certain queries that the customer may have about the handsets or the plans. The recommendation engine provides the most appropriate responses to the predicted queries of the customers as recommendations to the agent. In an embodiment, the recommendations that are generated by the recommendation engine infographic forms that are pushed directly or provided as links to the agent chat console 300 or to a customer chat console (explained below at least with reference to FIG. 4). In some embodiments, a widget may include mechanism for interactivity and/or feedback. The content and template of a widget can be customizable and both the customer and the agent may interact with the widget contents. A recommendation widget can include a recommendation that may aid the agent in understanding and fulfilling the need of the customer. For example, if the customer profile is that of an "exploratory customer", the recommended infographic would be a product comparison infographic (as suggested in recommendation section 318 by text "Plan A vs Plan B" illustrating a comparison between two product based plans), while if the customer profile is that of a "focused customer" the recommended infographic would be that of a recommended product and its key features.

The agent may have an option of displaying the recommendations to the customer directly by sending an URL or by sending the widget to the customer from his/her chat console based on nature of the recommendation. Additionally, the agent may use the widget to display content of a particular recommendation. In an embodiment, the agent may provide the recommendation to the customer by pressing a button such as a button 'show to customer' 322. By pressing the button 'show to customer' 322, contents of the particular recommendation is displayed to the customer in a customer chat console. In an embodiment, pressing the button 'show to customer' 322 constitutes implicit feedback for the recommendation engine. In some embodiments, implicit feedback about the relevance and timeliness of the recommendation is also recorded automatically when the agent chooses to display any part of the recommendation content to the customer. In addition, explicit feedback about the relevance and timeliness of the recommendations may also be collected from the agent. Such information may be logged as features by the processing module 202 along with the textual content of the dialogue as meta-data for aiding subsequent mining of the dialogues.

The palette 310 is depicted to include a number of buttons corresponding to a number of options for facilitating feature-tagging of textual content associated with a dialogue for confirmation drop-down list button 326, an emoticons palette button 328, a like/dislike button 330, a hash tag list button 332, a collaborative tagging button 334, a commitment tracker button 336, a 'save and share best response' button 338 and a stage confirmation drop-down list button 340. The palette options are not limited to the buttons listed above, and may include several other features that can be tagged in the chat conversations. It is understood that the order of the buttons 326-340 is presented herein for illustration purposes and that the order may vary in some embodiments. One or more buttons may be provisioned with requisite functionality by components of the system 200. For example, the tag list, button or dropdown menu 332, the 'save and share best response' button 338 and the stage confirmation drop-down list button 340 may communicate with certain components such as the hash tag database 210, the best response database 212 and the stage confirmation module 220 of the system 200 of FIG. 2 for provisioning their respective features.

In an embodiment, the intent confirmation drop-down list button 326 is configured to provide a list of customer's likely intents at a particular point in customer's journey on the website to the agent. By pushing the intent confirmation drop-down list button 326, a drop-down list containing the list of customer's likely intent is displayed to the agent. In an embodiment, the customer's likely intents may be ordered by probability of the intents. However, it is noted that the customer's likely intents may also be presented in a random order.

As explained above, when the customer browses through a website, the intent prediction engine predicts the customer's intent using a plurality of intent prediction models that use a combination of input features from historical customer interaction data to predict the customer's likely intents. In an embodiment, at any time during the dialogue between the agent and the customer, the agent may confirm the right intent of the customer by selecting any of the customer's likely intents that are listed in the intent drop-down list. This confirmation of the customer's intent may serve as a feedback for enhancing the accuracy of the intent prediction models included in the intent prediction engine.

In an embodiment, the customer and the supervisor may also confirm the right intent by selecting a button similar to the intent confirmation drop-down list button 326 provided in their own chat consoles such as the customer chat console and the supervisor chat console. In an embodiment, the set of predicted and confirmed intents by the agent (along with those selected by the customer and the supervisor) are stored as a feature along with the dialogue in a storage module 204 by the processing module 202 for future prediction of the customer's intents. In some embodiments, the intent confirmation may be configured to be mandatory for an agent, whereas the customer may be requested or incentivized to confirm the intents. In some embodiments, a supervisor may enforce a compliance of the mandatory intent confirmation by the agents under his/her supervision.

In an embodiment, the emoticons palette button 328 is configured to provide a palette of emoticons when the agent pushes the emoticons palette button 328 at any time during the dialogue. For example, during a dialogue when the agent desires to express his/her emotions along with the dialogue line, the agent may simply push the emoticons palette button 328 located in the palette 310 of the agent chat console 300. This provides the palette of emoticons that are available for the agent to choose his/her desired emoticons for the particular dialogue line. In an embodiment, the palette of emoticons may be an example of emoticons palette that is typically used in social media applications. In an embodiment, emotion features such as the emoticons that the agent has chosen for the particular dialogue line are stored along with the dialogue line in a storage module 204 by the processing module 202. In some embodiments, storing the emotion features along with the respective dialogue line may be useful for prediction models in the prediction engine to build emotion prediction models. In some embodiments, the customer emotions are visible to the agent, while the agent emotions are not visible to the customer unless explicitly required by the agent.

In an embodiment, the like/dislike button 330 is configured to facilitate the agent to provide his/her feedback by expressing his/her views of what he/she did or did not like during the dialogue by a push of the like/dislike button 330 in the palette 310 located in the agent chat console 300. Such a feedback from the agent may be used in refining the prediction of the customer emotion and the recommendation provided to the customer based on the intent. Further, these feedbacks may be used for labeling the customer's behavior and his/her expectations during the course of the dialogue. In an embodiment, the like/dislike button 330 may be an example of like/dislike feature available in the social media applications. It is noted that the like/dislike button 330 is represented as a single button in FIG. 3 for illustration purposes and it is understood that in some embodiments, the like and the dislike feature may independently be associated with a button each. In an embodiment, the like/dislike button 330 may also be provisioned on the customer chat console and the supervisor chat console and may be configured to function in a manner similar to the like/dislike button 330 of the agent chat console 300.

In an embodiment, the emoticons palette button 328 and the like/dislike button 330 may serve, at least in part, as an input to an emotion analyzer module 216 of the system 200, which is configured to analyze and track the emotions of the agent (or the customer) accurately throughout the dialogue. The emotion analyzer module 216 includes a set of emotion feature vectors that facilitate in tracking changes in the emotions throughout the dialogue. These emotion changes may be captured by various metrics that provide a better prediction of customer satisfaction. Examples of the metrics that are used to predict the customer satisfaction may include, but are not limited to, customer satisfaction score (CSAT), net promoter score (NPS), customer effort score (CES) and the like. The predictions related to a customer's satisfaction may be useful in situations where the customer is reluctant to complete feedback surveys or in a situation where the customer emotions may not be unambiguously mined from the dialogues alone. Further, at every stage during the dialogue, the emotion changes may also facilitate in refining the input to the prediction engine and the recommendation engine to improve the customer satisfaction and engagement by optimizing the dialogue sequence.

In an embodiment, the hash tag list button 332 is configured to facilitate the agent to add hash tags to the specific agent or customer dialogue lines to tag any feature of interest in the dialogue line. In an embodiment, the hash tag feature may be an example of hash tag feature used in social media applications, such as Twitter®. In an embodiment, the autosuggest module 214 may suggest completions to the hash tags for the agent. For example, when the agent types the hash tag (#), the autosuggest module 214 suggests a list of available hash tags to the agent, so that the agent can choose his/her desired hash tag. These hash tags may serve as an input to the set of text mining and other predictive models that may drive the prediction engine and the recommendation engine for predicting features and providing recommendations to the agent. In an embodiment, the hash tags may be of two types: (1) generic hash tags and (2) domain-specific hash tags. An example of a generic hash tag may be "#upsell" which refers to an upsell opportunity. An example of a domain-specific hash tag may be "#high data plan" which is specific to a telecom industry and refers to a mobile service provider's plan pertaining to high data usage. In an embodiment, both the generic hash tags and the domain-specific hash tags may serve to disambiguate the context to facilitate in training the dialogue mining and other predictive models.

In an embodiment, the list of hash tags is stored in the hash tag database 210 of the system 200. In an embodiment, when the agent types the hash tag ('#'), the autosuggest module 214 communicates with the hash tag database 210 to provide the agent with the available list of hash tags that are stored in the hash tag database 210. When the agent continues to types his/her desired hash tag, the autosuggest module 214 filters the list of hash tags and provides to the agent the most appropriate suggestions that matches with the hash tag that was typed by the agent. In an embodiment, if the hash tags that are suggested by the autosuggest module 214 is ignored by the agent, then the suggestions may be removed and the agent may continue typing the hash tag. In an embodiment, if the hash tag that was typed by the agent is not available in the set of hash tags that are stored in the hash tag database 210, then a new hash tag is created and stored in the hash tag database 210. In an embodiment, hash tag list button 332 may also be available in the customer chat console and the supervisor chat console and the button may be configured to function in a manner similar to the hash tag list button 332 of the agent chat console 300.

In an embodiment, the collaborative tagging button 334 is configured to provision access to labels, such as "useful", "timely" and the like for tagging the recommendations. For example, when the agent is recommended with certain recommendations in the recommendation section 318 of the agent chat console 300 during the dialogue, the agent may push the collaborative tagging button 334 to access labels to add to the specific recommendation. These recommendations along with the tagged labels are stored as features in the storage module 204 by the processing module 202 along with the dialogue lines during which the specific recommendations were provided to the agent. These features are fed back to the predictive models that drive the recommendation engine. In an embodiment, the tagging of recommendations with the labels may be carried out both by the agent and his/her supervisor. In an embodiment, all the features tagged by the agent, the customer and the supervisor are retained in the storage module 204 and only their relative weights are suitably corrected in case of a conflict between the tags.

In an embodiment, the commitment tracker button 336 is configured to facilitate a tagging of a particular line in the dialogue as a commitment that was made to the customer. For example, during a dialogue, the agent may suggest the following line: "You will receive a confirmation email in 24 hours" to a customer. This line is a commitment that was given to the customer by the agent. So, the agent, by pushing the commitment tracker button 336 may flag the line "You will receive a confirmation email in 24 hours" as a commitment. This line is saved as a commitment feature in the storage module 204 by the processing module 202. In subsequent interactions with the customer, the agent may have an access to the commitment that was tagged by the agent. Further, the intent prediction engine and the recommendation engine may also have an access to the saved commitment in order to ensure seamless context transfer of interactions between the agent and the customer. In an embodiment, the commitment tracker module 218 may keep track and monitor commitments made by the agents to the customers and facilitate access to the respective commitments from the storage module 204. By accessing the stored commitment by using the commitment tracker module 218, the agent may not require to read the entire past dialogue transcripts while interacting with the customer. In an embodiment, the commitment tracker module 218 is also configured to facilitate access to the commitments made by agents to a supervisor associated with the agents through a button available in the supervisor chat console.

In an embodiment, the 'save and share best response' button 338 is configured to facilitate a tagging of a dialogue line as exceptionally appropriate or efficacious for a given context in order to progress the dialogue towards a desired outcome. In an embodiment, the responses, which are tagged as best responses may be stored as a feature for a particular dialogue line in the best response database 212 and may be utilized as a training data to the recommendation engine to enhance the efficacy of the recommendation engine. The 'save and share best response' button 338, when pushed may communicate with the best response database 212 in order to save or retrieve the best responses along with the particular dialogue lines. In an embodiment, the 'save and share best response' button 338 is further configured to facilitate the agent (and in some embodiments, also the supervisor) to share the best responses along with the dialogue lines that are saved in the best response database 212 to other agents (also to other supervisors).

In an embodiment, the best responses may be shared between the agents by means of an agent-to-agent messaging application or a social media application and the like. In an embodiment, the 'save and share best response' button 338 may also be displayed on the supervisor chat console and may be configured to function in a manner similar to the 'save and share best response' button 338 in the palette 310 of the agent chat console 300. In an embodiment, the supervisor may also flag the best responses along with the agent and the supervisor best responses may also be saved in the best response database 212. If there is any conflict between the responses that are tagged as best responses by the agent and the supervisor, then the best responses that are tagged by both the agent and the supervisor are associated with suitable weights and fed as the training data to predictive models.

In an embodiment, the stage confirmation drop-down list button 340 is configured to facilitate a confirmation of a particular stage at any point during the dialogue with the customer. For example, a service related dialogue may include various stages such as a greeting stage, an authentication stage, a problem identification stage, a problem resolution stage, and a closure stage. In an embodiment, predictive models may exploit these stages for intent prediction of the customer and in order to provide recommendations to the agent. In an embodiment, the agent may push the stage confirmation drop-down list button 340, which is further configured to communicate with a stage confirmation module 220 to access a list of stages, for the agent to confirm a stage at any point during the dialogue. For example, when the agent and the customer initiate a dialogue and the customer and the agent greet each other, then the agent may push the stage confirmation drop-down list button 340 to receive a drop-down list containing the list of stages from the stage confirmation module 220. From the list of stages, the agent may select a stage for a particular line for tagging the dialogue line. For example, the greeting at the beginning of the dialogue may be tagged as a greeting stage. Accordingly, each stage during the dialogue is tagged by selecting the right stage from drop-down list provisioned by the stage confirmation drop-down list button 340.

In an embodiment, the stage confirmations that are made by the agent during the dialogue serve as a feedback for enhancing the accuracy of the prediction models. The predicted and confirmed stages can be are saved as features in the storage module 204 by the processing module 202. In an embodiment, a stage confirmation drop-down list button, such as the stage confirmation drop-down list button 340, is available in the supervisor chat console and configured to function in a similar manner to the stage confirmation drop-down list button 340.

In an embodiment, the supervisor may also tag a particular stage during the dialogue along with the agent and the dialogue lines that are tagged with the stage by the supervisor and the agent are stored as the feature in the stage confirmation module 220. If there is any conflict between the stages that are tagged by the agent and the supervisor, then the stages that are tagged by both the agent and the supervisor are associated with suitable weights and fed as the training data to predictive models.

Referring now to FIG. 2, the system 200 includes a canned response database 208, which is configured to store a library of phrases and sentences (hereinafter referred to as 'canned responses') that are frequently used by the agents along with an associated category for each of such phrases and sentences. For example, each of the canned responses may be categorized in to various categories such as "Greeting Time", "Problem Identification", "Problem Resolution", "Closure" and the like. Each of the categories may include different set of canned responses, which may be accessed by the agent through the canned response database 208. For example, the category "Greeting Time" may include different canned responses such as "Hi", "Good Morning", "Good Afternoon", "Good Night" and the like. Accordingly, the agent may select his/her desired canned response during the dialogue. In an embodiment, the canned responses along with its respective categories may serve as markers to indicate various stages during the dialogue.

In an embodiment, each new dialogue line that has been typed by the agent is scored to compute a similarity between the new dialogue line and the canned responses using various scoring techniques. Examples of the scoring techniques may include, but are not limited to, Euclidean distance, Manhattan distance, Google distance, Bing distance, Wiki distance, Wordnet distance, Cosine similarity, Jaccard similarity, Lexical similarity, Semantic similarity and the like. After computing the similarity between the new dialogue line and the canned responses, the most similar canned response along with its category is tagged as a feature to the new dialogue line. In an embodiment, the tagged feature along with the new dialogue line is stored in the storage module 204 by the processing module 202. For every subsequent new dialogue line that has been typed by the agent, the similarity is computed with respect to the canned responses and the most similar canned response for each of the new dialogue line is tagged as a feature and stored in the storage module 204.

In an embodiment, each of the features that have been tagged for each of the dialogue lines may facilitate in building a corpus of extensively labeled training data for predictive models that drive the intent prediction engine and the recommendation engine. Further, tagging the agent dialogue line with the features may also facilitate the canned response database 208 in tagging the customer dialogue lines. In an embodiment, the canned response database 208 is configured to utilize predictability of agent responses along with the order or flow inherent in any dialogue to render customer responses more predictable. Further, the canned response database 208 may have the ability to capture structure of a dialogue line and label the dialogue line with different stages.

Labeling the dialogue lines in different stages of the dialogue may facilitate in mining the textual content of the dialogue lines and also the sequence of the dialogue. This process of mining may in turn facilitate in optimizing the process or flow in the dialogue to achieve the desired outcome better and faster. For example, depending on the differences in flow sequences between that dialogues which may end in purchase and the dialogues that do not end in purchase, the cross-sell strategy and the up-sell strategy may be optimized accordingly. Such optimization based on the mining of the textual content and the sequence of the dialogue may improve the coverage and the accuracy of the predictive models substantially.

The canned response database 208 may also facilitate a labeling of dialogue lines as a customer dialogue line and a supervisor dialogue line. Further, as explained above, the canned response database 208 is configured to communicate with the autosuggest module 214 to suggest certain phrases or sentences that are stored in the canned response database 208 to the agent.

The autosuggest module 214 may also be configured to facilitate a building a corpus of labeled data and also enhance an accuracy of the labeled data by reducing misspellings and unintended variations in labeled data. An example customer chat console is explained with reference to FIG. 4.

Referring now to FIG. 4, a customer chat console 400 to enable a customer to engage in a dialogue with an agent is illustrated in accordance with an embodiment. The customer chat console 400 is depicted to include a title bar 402, a chat dialogue display section 404, an autosuggest section 406 and a palette 408 of options for facilitating feature-tagging of textual content associated with the dialogue between the customer and the agent. The title bar 402 may be configured to display at least one of a name of an entity associated with the agent involved in the dialogue, a customer name and the like. The chat dialogue display section 404 is configured to display the chat dialogue between the customer and the agent in an on-going manner in real-time. The chat text typed by the customer and the agent is displayed next to the customer name and the agent name, respectively, as exemplarily illustrated in dotted blocks 410 and 412 in the chat dialogue display section 404.

In an embodiment, the autosuggest section 406 is configured to allow the customer to type in text and facilitate the completion of the word/line corresponding to the text. For example, in FIG. 4, the customer is depicted to be typing a line "I am looking for the $35" in the autosuggest section 406, when a suggestion box 414 provides a suggestion "$35 Freedom Plan" as a possible completion of the sentence. The autosuggest module 214 depicted in FIG. 2 may be configured to facilitate provision of suggestions for word/line completions. A subsequent selection (or even a non-selection) of the suggestion offered in the suggestion box 414 may be considered as validation/non-validation of a correctness of the suggestion offered and as such, this information may be stored along with the corresponding textual content as a feature (for example, meta-data) for subsequent use in dialogue mining.

The palette 408 is depicted to include a plurality of buttons corresponding to a plurality of options for facilitating tagging of textual content associated with a dialogue for enabling efficient dialogue mining subsequently. The palette 408 includes an intent confirmation drop-down list button 416, an emoticons palette button 418, and a like/dislike button 420. It is understood that the order of the buttons 416-420 is presented herein for illustration purposes and that the order may vary in some embodiments. One or more buttons may be provisioned with requisite functionality by components of the system 200.

In an embodiment, the components such as the intent confirmation drop-down list button 416, the emoticons palette button 418 and the like/dislike button 420 are configured to perform a similar function to the intent confirmation drop-down list button 326, the emoticons palette button 328 and the like/dislike button 330 of the palette 308 of the agent chat console 300 (explained with reference to FIG. 3), respectively. A chat console associated with a supervisor supervising a dialogue involving an agent under his/her supervision is depicted in FIG. 5.

Referring now to FIG. 5, a supervisor chat console 500 configured to enable a supervisor to supervise dialogues of agents is illustrated in accordance with an embodiment. The supervisor chat console 500 is depicted to include a first section 502 for viewing live dialogues between agents and customers, a second section 504 for viewing recommendations, a comments display section 506, a dashboard view panel 508, a past chats view panel 510 and a palette 512 of options for facilitating feature-tagging of textual content associated with a dialogue between an agent and a customer.

The first section 502 includes a title bar 514, a chat dialogue reference section 516 and a chat dialogue display section 518. The title bar 514 is depicted to include the text "View Live Chat" indicating that area below is configured to display live chats between an agent and a customer. As explained with reference to FIG. 2, a supervisor may supervise dialogues involving one or more agents under his/her supervision. Accordingly, a supervisor may toggle views to select any one from among several on-going dialogues between agents and customers and view the chat dialogue un-folding in real-time in the first section 502. Each dialogue may be associated with one or more forms of identification, such as interaction identification (ID) number, a queue number and the like. Upon selection of a dialogue for supervision, the corresponding identification information of the dialogue is displayed in the chat dialogue reference section 516, which is depicted to display information such as the agent identification of the agent involved in the chat along with the interaction ID and the queue number.

The chat dialogue display section 518 is configured to display the dialogue between the customer and the agent in an on-going manner in real-time. The chat text typed by the agent and the customer is displayed next to the agent name and the customer name, respectively, as illustrated in dotted blocks 520 and 522 in the chat dialogue display section 518. The live view of the dialogue between the agent and the customer facilitates the supervisor to perform a real-time quality check on the dialogue and provide a feedback on the dialogue to the agent.

The supervisor may provide his comments through the comment display section 506. In some embodiments, the supervisor comments is only be visible to the agent in an agent chat console, e.g., agent chat console 300. In an embodiment, the second section 504 includes a title bar 524 including the text "View Recommendations", a recommendation section 526 including the 'show to customer' button 528, and a customer profile section 530. The recommendations section 526, the 'show to customer' button 528 and the customer profile section 530 are configured to serve a purpose similar to that explained for the recommendations section 318, the 'show to customer' button 322 and the customer profile section 320 as explained at least with reference to FIG. 3.

The palette 512 is depicted to include a plurality of buttons corresponding to a plurality of options for facilitating feature-tagging of textual content associated with a dialogue for enabling efficient dialogue mining subsequently. The palette 512 is depicted to include an intent confirmation drop-down list button 532, an emoticons palette button 534, a like/dislike button 536, a hash tag list button 538, a collaborative tagging button 540, a commitment tracker button 542, a 'save and share best response' button 544 and a stage confirmation drop-down list button 546. It is understood that the order of the buttons 532-546 is presented herein for illustration purposes and that the order may vary in some embodiments. One or more buttons may be provisioned with requisite functionality by components of the system 200. The buttons in the palette 512 can serve a purpose similar to the respective buttons in palette 310.

In an embodiment, when the supervisor clicks the dashboard view button 508, the supervisor may view the performance metrics of the agents under his supervision. Accordingly, the supervisor may quickly have an overview about the performance of his/her agents and the supervisor may provide his/her feedback to the agents in real time. Further, the supervisor is provided with a past chats view button 510, which may provide the supervisor with the past chat interactions of a particular agent with the customer. These past chat interactions may aid the supervisor in evaluating a progress of the dialogue and offer suggestions to the agent for improved chat performances in future.

As explained above, the dialogue between the agent and the customer can be tagged with features (for example, at a word level, a line level or at entire corpus level) in an on-going manner as the dialogue unfolds in real-time. Further, the supervisor may also tag the dialogue with various labels to form the features. These features along with the corresponding dialogue lines (form the agent, the customer and the supervisor) are stored in storage module 204 by the processing module 202. An example storage schema for storing the features along with the dialogue lines in the storage module 204 is depicted in Table 1 below.

TABLE 1

Example Storage Schema

| Tag Type | Tag Entry |
|---|---|
| Chat ID (unique identifier per chat) | |
| Chat Line Number | |
| Chat Line By (Agent/Customer/Supervisor) | |
| Chat Line Time | |
| Chat Line Text | |
| Confirmed Intent Customer | |
| Emoticons Customer | |
| Like/Dislike Customer | |
| Confirmed Intent Agent | |
| Emoticons Agent | |
| Like/Dislike Agent | |
| Confirmed Stage Agent | |
| Hash tags Agent | |
| Domain specific hash tags Agent | |
| Collaborative recommendation tags Agent | |
| Commitment tracker Agent | |
| Save and Share Best response Agent | |
| Confirmed Intent Supervisor | |
| Emoticons Supervisor | |
| Like/Dislike Supervisor | |
| Confirmed Stage Supervisor | |
| Hashtags Supervisor | |
| . . . | |
| Supervisor comments | |
| Outcome Variable 1 (Sale/No Sale) | |
| Outcome Variable 2 (Resolved/Unresolved) | |
| . . . | |
| Outcome type, resolution type, customer segments, "cheapest product", "highest data plan", product codes, product names, product categories, product attributes, emotion for | |

TABLE 1-continued

Example Storage Schema

| Tag Type | Tag Entry |
|---|---|
| product attributes, affinity towards product attributes, customer/agent personas, cross-sell/up-sell attempt and outcome, customer intent, probing questions, etc. | |

As can be seen from Table 1, various features that may be recorded using the options in the palettes 310, 408 and 512 explained above are listed in a row titled 'Tag type'. The recorded observations corresponding to the features are recorded in a row titled 'Tag entry'. This stored information enables efficient dialogue mining as explained further with reference to FIG. 6.

Figure 6:
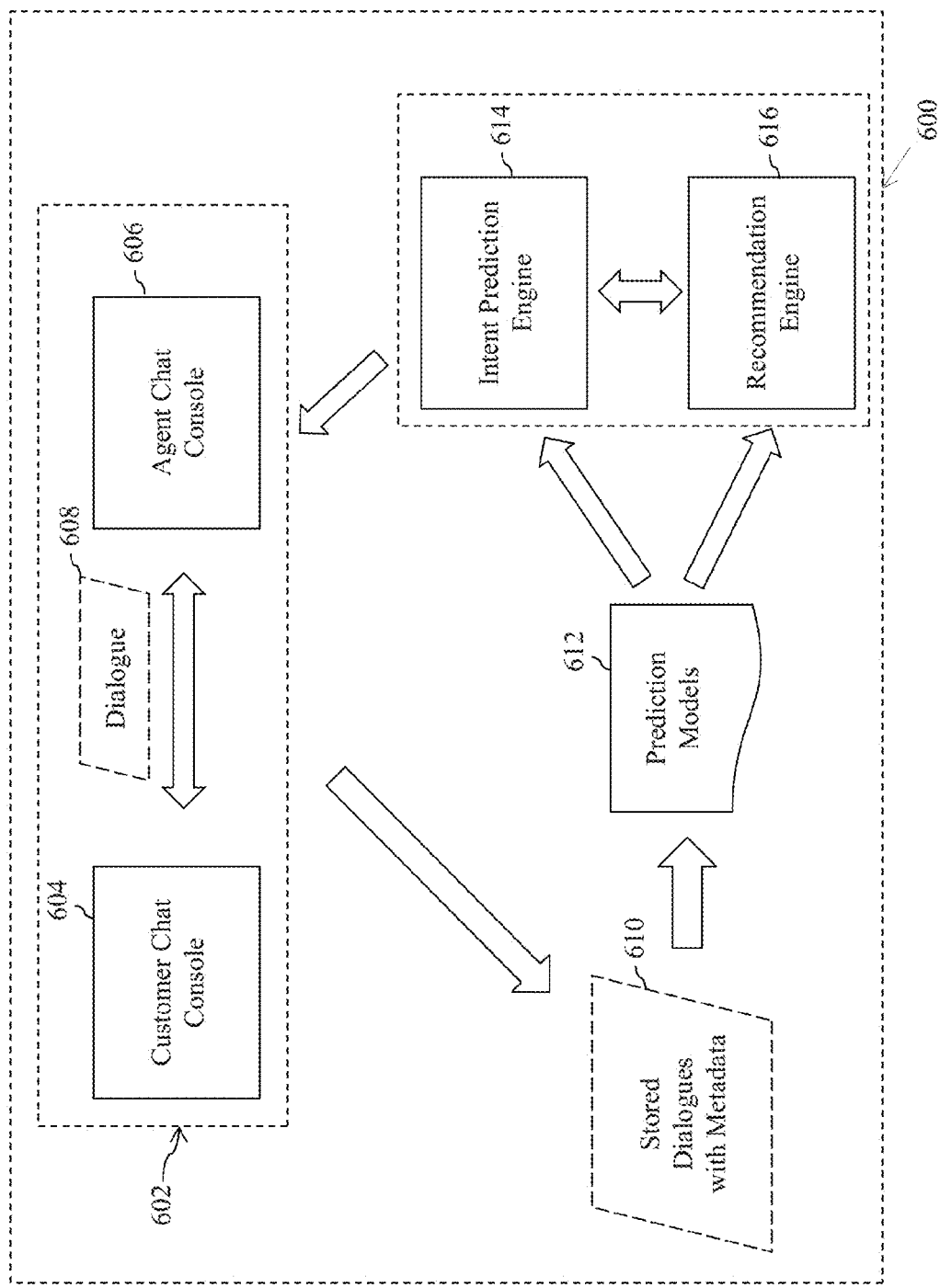
FIG. 6 depicts a process flow for mining of dialogues in accordance with an embodiment.

Referring now to FIG. 6, a simplified process 600 for mining of dialogues in accordance with an embodiment. At step 602 of the process flow 600, a customer initiates an interactive chat conversation with an agent on a website using a customer chat console 604, (such as the customer chat console 400 explained in reference with FIG. 4). The agent participates in the chat conversation using an agent chat console 606, such as the agent chat console 300 explained at least with reference to FIG. 3. The dialogue 608 corresponding to the chat conversation is tagged with features/meta-data as explained with reference to FIGS. 2 to 5.

At step 610, the dialogues, such as the dialogue 608, are stored along with corresponding meta-data.

At step 612, text mining and other prediction models are run on the dialogues stored along with the corresponding meta-data. Examples of the prediction models may include, but are not limited to Logistic regression, Naïve Bayesian, Rule Engines, Neural Networks, Decision Trees, Support Vector Machines, k-nearest neighbor, K-means and the like. The prediction models may be configured to extract certain features from the customer interactions or from the agent interactions or from both customer and agent interactions. Further, the prediction models may be configured to extract features by utilizing a relationship between the customer and agent interactions (for example, emotion of the customer for a given agent response). Examples of the features that may be fed into the prediction models may include, but are not limited to, any combinations of words features such as n-grams, unigrams, bigrams and trigrams, word phrases, part-of-speech of words, emotion of words, emotion of sentences, position of words, customer keyword searches, customer click data, customer web journeys, the customer interaction history and the like. In an embodiment, the prediction models may utilize any combination of the above-mentioned input features along with the customer interaction data such as, but not limited to, which agent handled the dialogue, what the outcome was, chat transfers if any and the like to predict the customer's likely intents.

The prediction models are configured to mine relevant information that drives an intent prediction engine 614 and a recommendation engine 616. In some embodiments, the intent prediction engine 614 and the recommendation engine 616 are similar to the intent prediction engine 154 and the recommendation engine 156, respectively. The mined information enables the intent prediction engine 614 to infer intents of the customers for contacting the agents, and the recommendation engine 616 to propose recommendations based on the customer profile and the inferred intent. In an embodiment, the predicted intents may be ordered based on percentage measure of likelihood and provisioned to the customer/agent/supervisor upon accessing the intent confirmation drop down lists in their respective chat consoles as explained with reference to FIGS. 3 to 5.

Further, the proposed recommendation is provisioned by the recommendation engine 616 to the agent/supervisor in the recommendation areas of their respective chat consoles as explained with reference to FIGS. 3 to 5. In an embodiment, the meta-data stored along with the chat enables capturing context, emotion, intent, and progress towards the goal of the dialogues in real-time. The method 600 can reduce unstructured streaming text conversations to structured text conversations labeled with features in real-time, which vastly improves a quality of mined information with corresponding improvement in intent prediction and provision of recommendation to the agent/customer. A method facilitating dialogue mining is explained with reference to FIG. 7.

Figure 7:
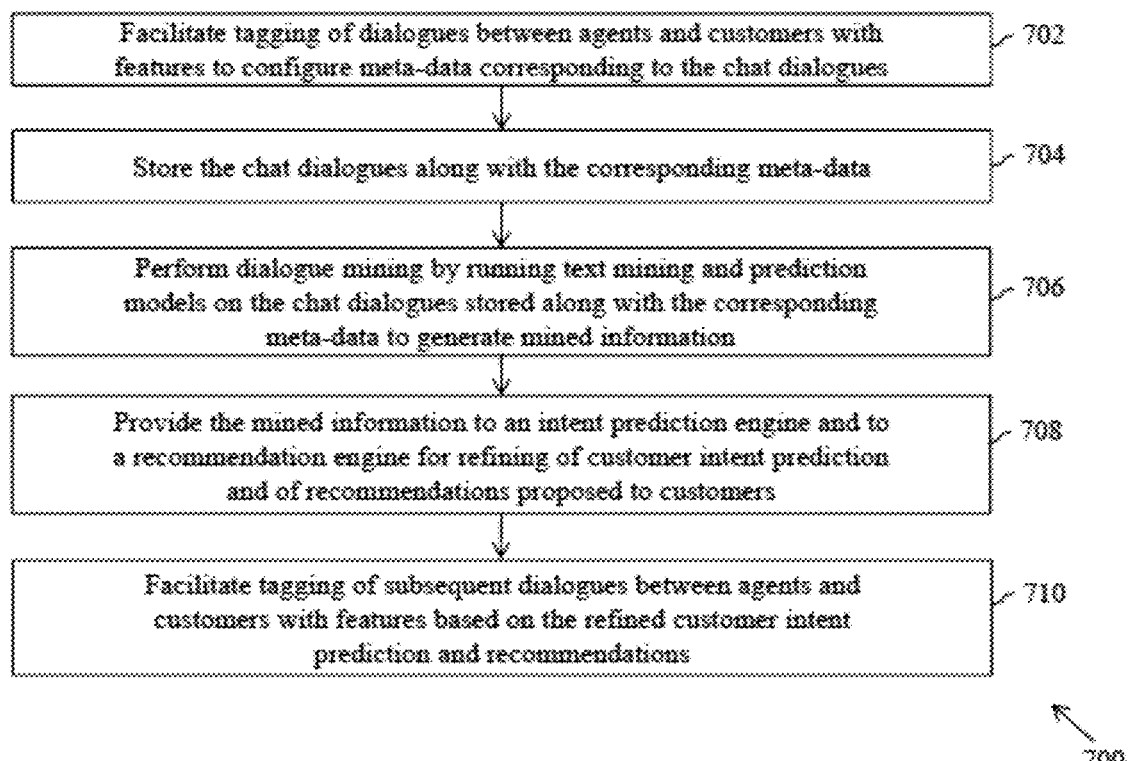
FIG. 7 is a flow diagram of a method for facilitating dialogue mining in accordance with an embodiment.

FIG. 7 is a flow diagram of a method 700 for facilitating dialogue mining in accordance with an embodiment. In some embodiments, the method 700 may be performed by the system 200 of FIG. 2 and in environment 100 of FIG. 1. At block 702, the processing module 202, facilitates tagging of dialogues between agents and customers with features to configure meta-data corresponding to the dialogues. As explained with reference to FIGS. 3, 4 and 5, the system 200 may be configured to populate chat consoles of agents, customers and supervisors with various options, such as those related to intent confirmation, emoticons, like/dislike options, stage confirmation, canned responses and the like, which may utilized to tag or label chat words, chat lines, portions of chat with features. The tagged features enable a capturing of context, emotion, intent, and progress towards the goal of the chat as the chat conversation unfolds in real-time.

At block 704, the processing module 202 stores the tagged features (the meta-data) corresponding to the dialogues along with the dialogues in the storage module 204.

At block 706, the mining engine 160 performs text mining on the dialogues and the corresponding meta-data to generate mined information. The mining engine 160 can perform the text mining based on various prediction models. The prediction models, such as those explained with reference to FIG. 6 may be utilized for performing the text mining.

At block 708, the mining engine 160 provides the mined information to an intent prediction engine, e.g., intent prediction engine 154 or 614, and a recommendation engine, e.g., recommendation engine 156 or 616, to infer and/or refine previously inferred the customer intent, and propose and/or refine previously proposed recommendations.

At block 710, the processing module 202 can continue the process 700 by enabling the customer/agent to continue the tagging of subsequent dialogues between agents and customers with features based on the refined customer intent prediction and recommendations.

Various embodiments disclosed herein provide numerous advantages for mining dialogues. The disclosed embodiments facilitate in adding features to on-going dialogues in real-time and storing the dialogues along with the corresponding features to enable easier mining of information therefrom. Further, the disclosed embodiments substantially enhance the accuracy, coverage and speed of subsequent text mining processes by facilitating in capturing context, emotion, intent, and progress towards the goal of the text conversations in real-time. More specifically, the disclosed embodiments reduce unstructured streaming dialogues to structured dialogues labeled with features in real-time. These features serve as inputs to predictive models, and also provide the feedback needed to refine the predictive models for mining of subsequent dialogues.

Further, the system 200 may also be configured to facilitate tagging of dialogues, such as voice call conversations. For example, a speech recognition engine (such as an automatic speech recognition engine and statistical language models in addition to a domain-specific grammar data) may be utilized to convert voice call interactions into textual content, which may then be tagged with features as explained at least with reference to FIGS. 2 to 5. It is understood that appropriate adjustments may be defined in such cases. For example, during a voice call based dialogue between an agent and a customer, the predicted intents and recommendations may be passed on to a customer device, such as a smartphone, in form of widgets. The confirmation of intents and/or selection of recommendations on the smartphone may be tagged as features and stored along with the transcripts corresponding voice call dialogues. The agents may also press pre-defined numerals to indicate different stages within a dialogue to confirm the stages and record them as features. A supervisor may also join-in in an ongoing voice call conversation between an agent and a customer and may tag the conversation with features.

In an embodiment, features stored along with corresponding dialogues as meta-data may be used to define various contexts where certain responses may be deemed to be appropriate. These features may be further used to predict best responses from among the certain appropriate responses for a given context under a given desired outcome. The system 200 may be configured to support a chat bot, which may parse the chat interactions, identify the context of the chat interactions and respond with a most appropriate response to the customer. In an example scenario, if the agents are not available to respond to queries of the customer or for certain queries that do not require human response, the chat bot may be used to respond to various queries of the customer. The chat bots may also be used for training related purposes.

It is also noted that various embodiments have been explained herein with reference to a dialogue initiated during a customer activity on a website. However, the embodiments described herein may not be limited to dialogues initiated on websites only. In some embodiments, the dialogues may be initiated by a customer while surfing a mobile application on a customer device, like a smartphone. Accordingly, embodiments described herein may be configured to cater to multiple channels and over multiple devices and may not be limited to dialogues initiated on a specific medium/channel.

Figure 8:
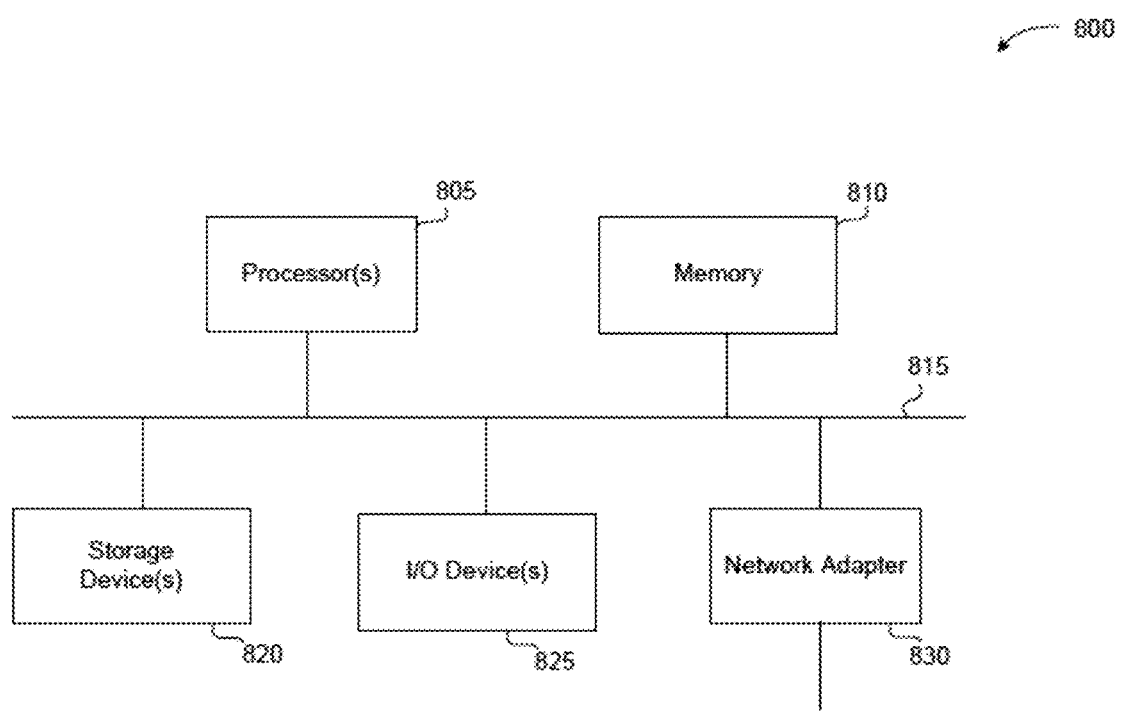
FIG. 8 is a block diagram of a computer system as may be used to implement features of some embodiments of the disclosed technology.

FIG. 8 is a block diagram of a computer system as may be used to implement features of some embodiments of the disclosed technology. The computing system 800 may be used to implement any of the entities, components or services depicted in the examples of FIGS. 1-7 (and any other components described in this specification). The computing system 800 may include one or more central processing units ("processors") 805, memory 810, input/output devices 825 (e.g., keyboard and pointing devices, display devices), storage devices 820 (e.g., disk drives), and network adapters 830 (e.g., network interfaces) that are connected to an interconnect 815. The interconnect 815 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 810 and storage devices 820 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 810 can be implemented as software and/or firmware to program the processor(s) 805 to carry out actions described above. In some embodiments, such software or firmware may be initially provided to the processing system 800 by downloading it from a remote system through the computing system 800 (e.g., via network adapter 830).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for facilitating a communication system to generate a set of messages for an agent to respond to a customer, comprising:
   converting a plurality of messages exchanged between the customer and the agent during a dialog to a plurality of structured messages, the plurality of messages exchanged using a chat application that is configured to execute on a first computing device associated with the agent and a second computing device associated with the customer, the converting comprising:
   tagging the plurality of messages, at least by the agent, with one or more features of a plurality of features, wherein each of the features depict one or more extracted aspects of the dialog; and
   storing the plurality of messages with their tagged features as the plurality of structured messages at a storage system associated with the communication system, the storage system comprising a second plurality of structured messages that represent a second plurality of messages exchanged between a plurality of agents and a plurality of customers, the second plurality of structured messages tagged with a second plurality of features;
   generating, by the communication system, a first message depicting an intent of the customer for contacting the agent, the generating comprising:
   extracting, based on one or more prediction techniques, a group of features and a group of messages from the plurality of structured messages, the second plurality structured messages, the plurality of features and the second plurality of features using a text mining process to generate mined data;
   determining the intent of the customer as a function of the mined data and a user profile of the customer; and
   generating, by the communication system, based on the determined intent, a second message containing one or more recommendations for responding to the customer.

2. The method of claim 1, said tagging further comprising:
automatically tagging using any of information extraction algorithms, named entity recognition for person name and location name, spell checking algorithms, string similarity, emotion features, persona features, nps drivers, dialog stage, canned phrases, check marks, radio buttons, voice referral, chat transfer, and chat disconnects.

3. The method of claim 1, further comprising:
exposing different features to different target groups for tagging.

4. The method of claim 2, said tagging further comprising:
collaborative tagging for validating and/or correcting the automatic tagging.

5. The method of claim 1, further comprising:
integrating incremental learning or active learning models to showcase a reduced set of categories for selection instead of an entire list.

6. The method of claim 5, wherein said reduced set comprises a most likely set of categories as predicted by a model.

7. The method of claim 5, wherein categories with least confidence scores from the model are showcased for selection to tag more data to improve model performance for those categories over time.

8. The method of claim 4, said collaborative tagging further comprising:
agents, customers, supervisors, and QA teams using any of a plurality of widgets for collaborative tagging to improve the speed, efficiency, and accuracy of data collection.

9. The method of claim 1, further comprising:
event based tagging to capture features as structured data, wherein said events comprise any of a number of deletions, backspaces used by the agent, the number of copy paste events that occurred for an agent recommendation, and feedback button clicks on agent recommendations.

10. The method of claim 1, further comprising:
tracking cross-sells and outcomes with text categorization models that predict a cross-sell and an outcome type in a chat.

11. The method of claim 1, further comprising:
tracking cross-sells and outcomes with a collaborative platform.

* * * * *